US012640627B2

(12) United States Patent

Liang et al.

(10) Patent No.: US 12,640,627 B2

(45) Date of Patent: May 26, 2026

(54) HEAT DISSIPATION DEVICE FOR OUTER ROTOR MOTOR

(71) Applicant: Zhongshan Broad-Ocean Motor Co., Ltd., Zhongshan (CN)

(72) Inventors: Zhicheng Liang, Zhongshan (CN); Xingfu Chen, Zhongshan (CN); Huixiu Chen, Zhongshan (CN); Hairong Sun, Zhongshan (CN); Rui Wang, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 215 days.

(21) Appl. No.: 18/765,319

(22) Filed: Jul. 7, 2024

(65) Prior Publication Data

US 2024/0380286 A1      Nov. 14, 2024

Related U.S. Application Data

(63) Continuation-in-part of application No. PCT/CN2023/113413, filed on Aug. 16, 2023.

(30) Foreign Application Priority Data

May 12, 2023    (CN) .......................... 202321143139.2

(51) Int. Cl.
H02K 9/22          (2006.01)
H02K 5/16          (2006.01)

(52) U.S. Cl.
CPC ............. H02K 9/227 (2021.01); H02K 5/161 (2013.01)

(58) Field of Classification Search
CPC ............................... H02K 9/227; H02K 5/161
See application file for complete search history.

(56) References Cited

U.S. PATENT DOCUMENTS

2020/0403472  A1*  12/2020  Lu ............................ H02K 5/18

FOREIGN PATENT DOCUMENTS

| CN | 101338731 | A | 1/2009 |
|----|-----------|---|--------|
| CN | 201312471 | Y | 9/2009 |
| CN | 102651953 | A | 8/2012 |
| CN | 213402646 | U | 6/2021 |
| CN | 216530859 | U | 5/2022 |
| JP | 2022150126 | A | 10/2022 |
| WO | 2021196516 | A1 | 10/2021 |

* cited by examiner

*Primary Examiner* — Viet P Nguyen

(74) *Attorney, Agent, or Firm* — MATTHIAS SCHOLL P.C.; Matthias Scholl

(57)          ABSTRACT

A heat dissipation device for an outer rotor motor, including: a rotary shaft, a stator assembly, an outer rotor, a sleeve seat, a wind wheel, an air guide cover, and a control box. The sleeve seat includes a bottom plate and a sleeve protruding upwards from a central part of the bottom plate; each of two ends of the sleeve includes a bearing chamber, and two bearings are disposed in two bearing chambers, respectively. The rotary shaft is disposed in the sleeve and both ends of the rotary shaft are supported on the two bearings. The outer rotor includes a casing sleeve, a plurality of permanent magnets attached to the inner wall of the casing sleeve, and a flange. One end of the rotary shaft extends from the sleeve and is connected to the casing sleeve. The inner wall of the casing sleeve extends outward to form the flange.

7 Claims, 10 Drawing Sheets

HEAT DISSIPATION DEVICE FOR OUTER ROTOR MOTOR

CROSS-REFERENCE TO RELATED APPLICATIONS

This application is a continuation-in-part of International Patent Application No. PCT/CN2023/113413 with an international filing date of Aug. 16, 2023, designating the United States, now pending, further claims foreign priority benefits to Chinese Patent Application No. 202321143139.2 filed May 12, 2023. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to a heat dissipation device for an outer rotor motor.

The motor controller (or control box) of a conventional outer rotor motor has a long and complex heat dissipation path, the air flow is slow and the flow rate is low, thus making the heat dissipation less effective.

As an improvement, a plurality of heat dissipation ribs are disposed on the outer surface of the control box, and an air guide cover is disposed outside the heat dissipation ribs to form a directional air flow channel. Several through holes are disposed on the bottom plate between the fan inlet and the air flow channel, allowing cold air to enter the fan inlet through the air flow channel and the through holes on the bottom plate. Although the design can accelerate the directional air flow and heat dissipation, the through holes on the bottom plate must be limited between adjacent heat dissipation ribs, and the size of the through holes is greatly limited. Thus, a large number of through holes are required, leading to complex structure, and difficult installation.

SUMMARY

The disclosure provides a heat dissipation device for an outer rotor motor, comprising: a rotary shaft, a stator assembly, an outer rotor, a sleeve seat, a wind wheel, an air guide cover, and a control box. The sleeve seat comprises a bottom plate and a sleeve protruding upwards from a central part of the bottom plate; each of two ends of the sleeve comprises a bearing chamber, and two bearings are disposed in two bearing chambers, respectively; the rotary shaft is disposed in the sleeve and both ends of the rotary shaft are supported on the two bearings, respectively; the outer rotor comprises a casing sleeve, a plurality of permanent magnets attached to an inner wall of the casing sleeve, and a flange; one end of the rotary shaft extends from the sleeve and is connected to the casing sleeve; the inner wall of the casing sleeve extends outward to form the flange and an opening surrounded by the flange, and the wind wheel is attached to a bottom end face of the flange; the stator assembly is disposed outside the sleeve, and the outer rotor is disposed outside the stator assembly; the control box comprises a box body, a control circuit board disposed in the box body, a plurality of vertical heat dissipation blades protruding from an outer surface of the box body; a part of the vertical heat dissipation blades is covered by the air guide cover; a vertical air duct is formed between every two adjacent heat dissipation blades and an inner wall of the air guide cover; the air guide cover comprises a top end comprising a plurality of protrusions; each of the plurality of protrusions comprises a through hole communicating with the vertical air duct; an edge of the bottom plate comprises a plurality of recesses, and the plurality of protrusions are correspondingly embedded in the plurality of recesses, respectively; and the through hole is disposed directly below an air inlet of the wind wheel.

In a class of this embodiment, the inner wall of the air guide cover comprises a plurality of first heat dissipation ribs corresponding to the plurality of heat dissipation blades.

In a class of this embodiment, the air guide cover comprises an outer surface comprising a plurality of second heat dissipation ribs.

In a class of this embodiment, a material for the air guide cover is metal.

In a class of this embodiment, the air guide cover comprises three protrusions spaced apart.

In a class of this embodiment, the through hole are square in shape.

In a class of this embodiment, each of the plurality of protrusions comprises two through holes.

The following advantages are associated with the heat dissipation device for an outer rotor motor of the disclosure.

The air guide cover comprises a top end comprising a plurality of protrusions; each of the plurality of protrusions comprises a through hole communicating with the vertical air duct; an edge of the bottom plate comprises a plurality of recesses, and the plurality of protrusions are correspondingly embedded in the plurality of recesses, respectively; and the through hole disposed directly below the air inlet of the wind wheel. The size of the through hole is not limited by the two adjacent heat dissipation blades, and the through hole is located outside the heat dissipation blades. The device is easy to assemble, and increases the air flow and improves the heat dissipation efficiency.

DETAILED DESCRIPTION

Figure 1:
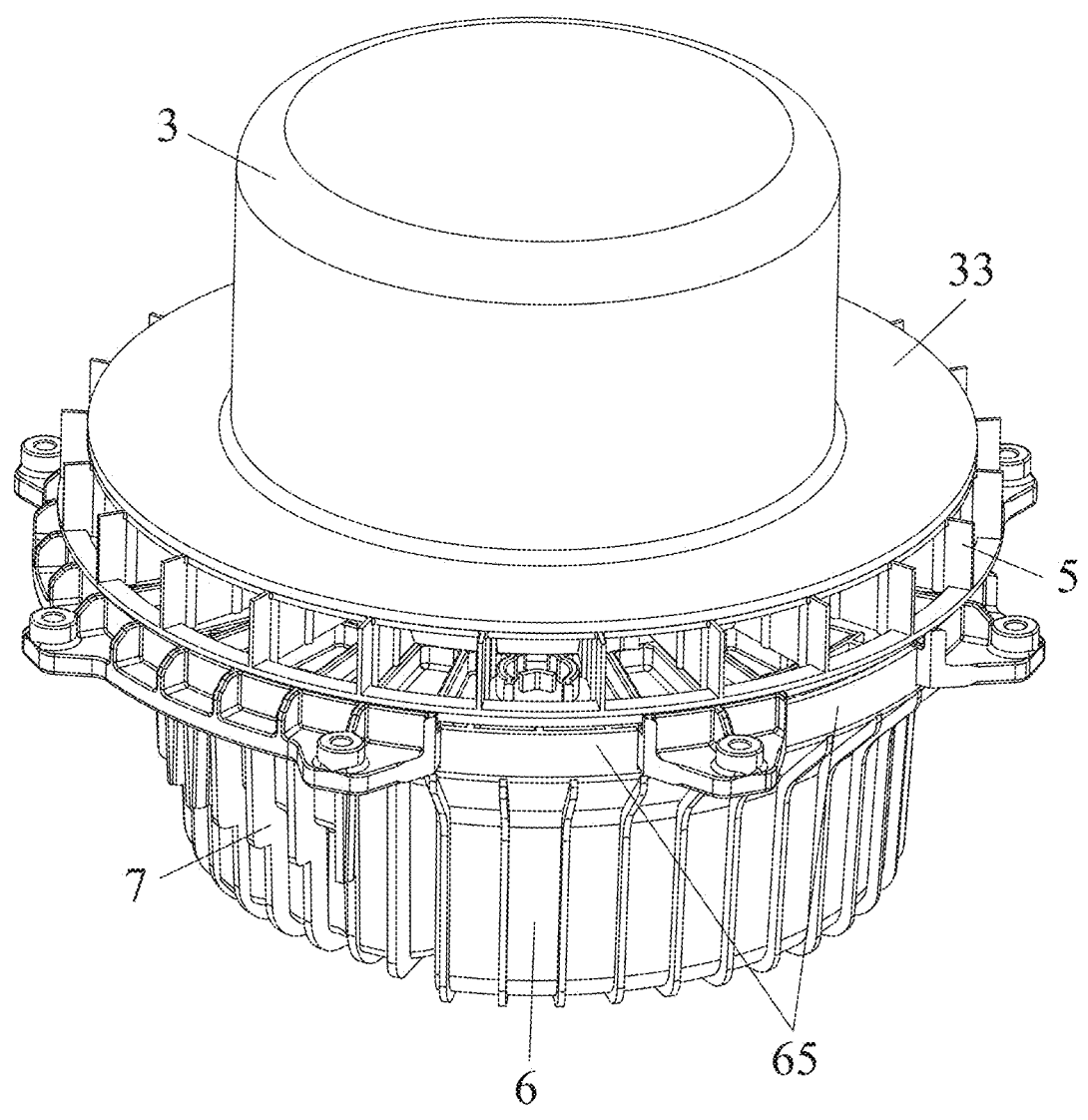
FIG. 1 is a schematic diagram of a heat dissipation device for an outer rotor motor in one embodiment of the disclosure.
Figure 2:
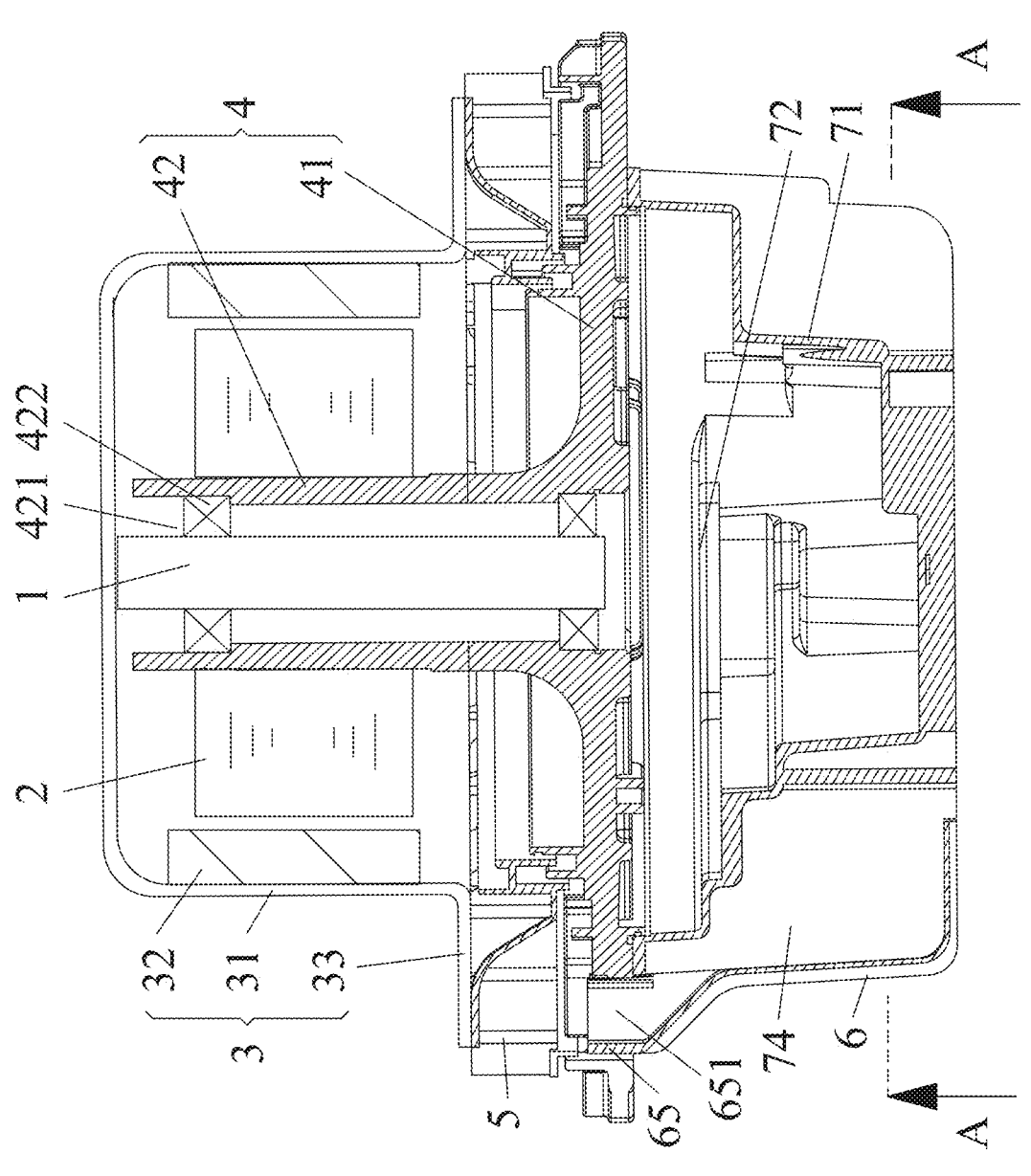
FIG. 2 is a sectional view of a heat dissipation device for an outer rotor motor in one embodiment of the disclosure.
Figure 3:
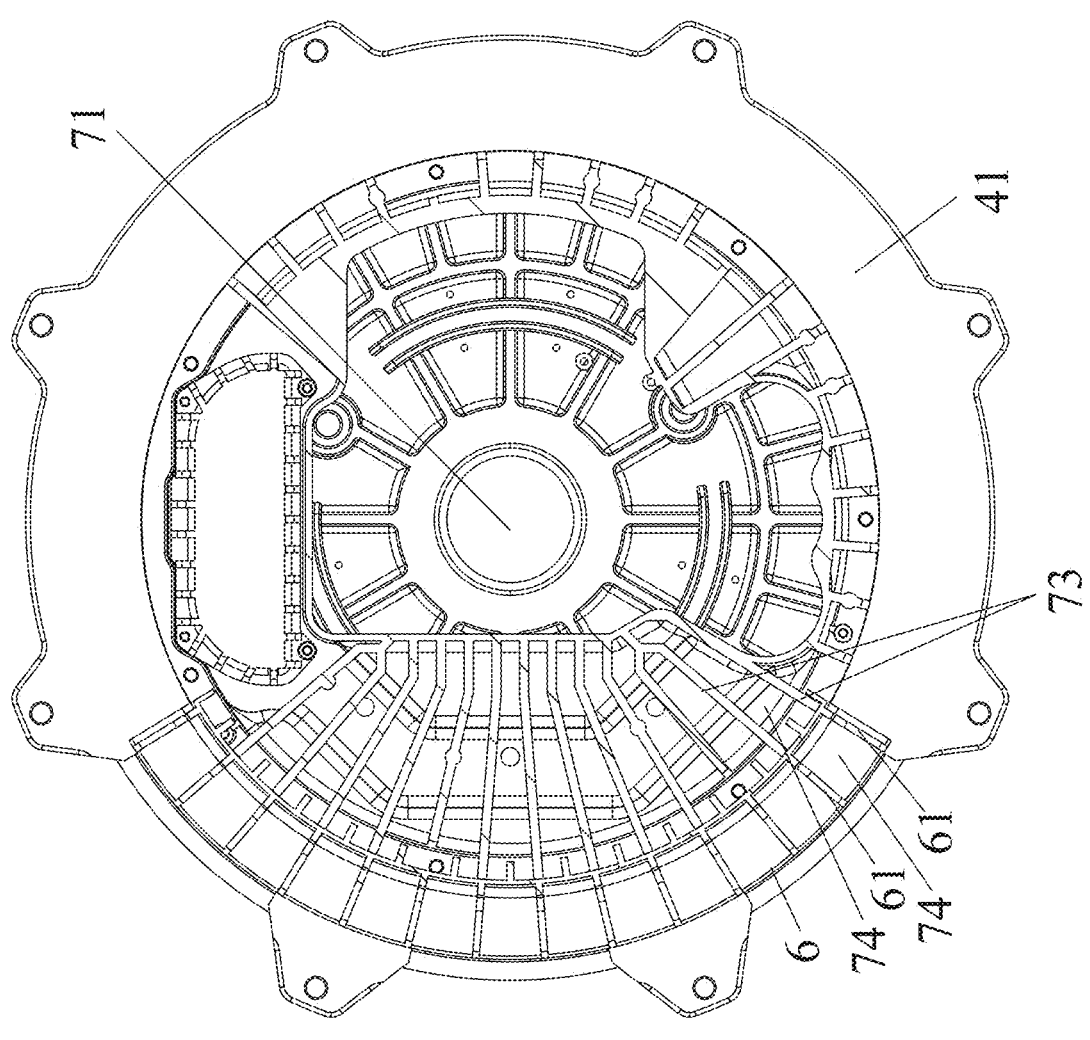
FIG. 3 is a bottom view of a heat dissipation device for an outer rotor motor from a view angle along A-A line in FIG. 2.
Figure 4:
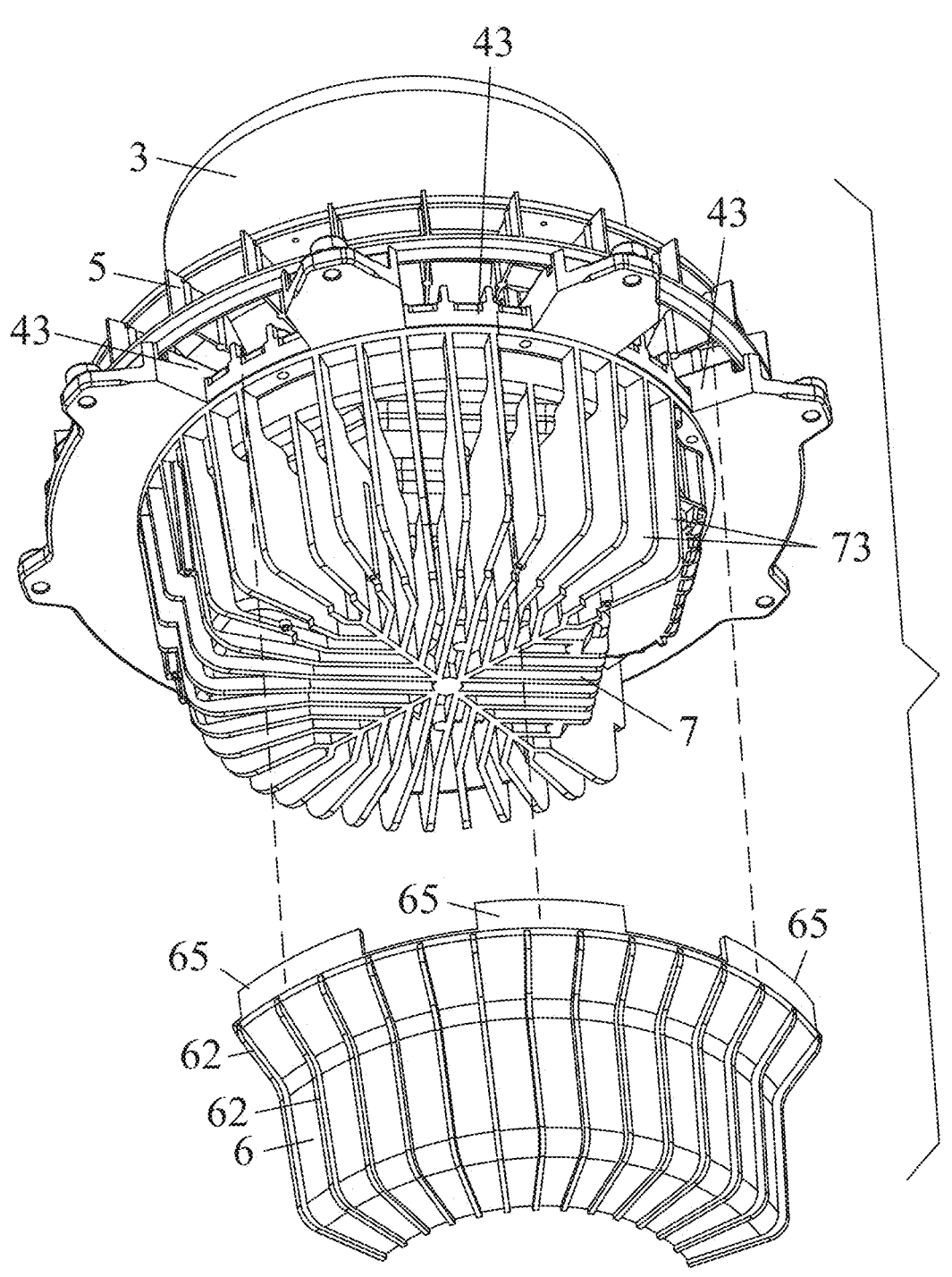
FIG. 4 is an exploded view of a wind wheel and an air guide cover in one embodiment of the disclosure.
Figure 5:
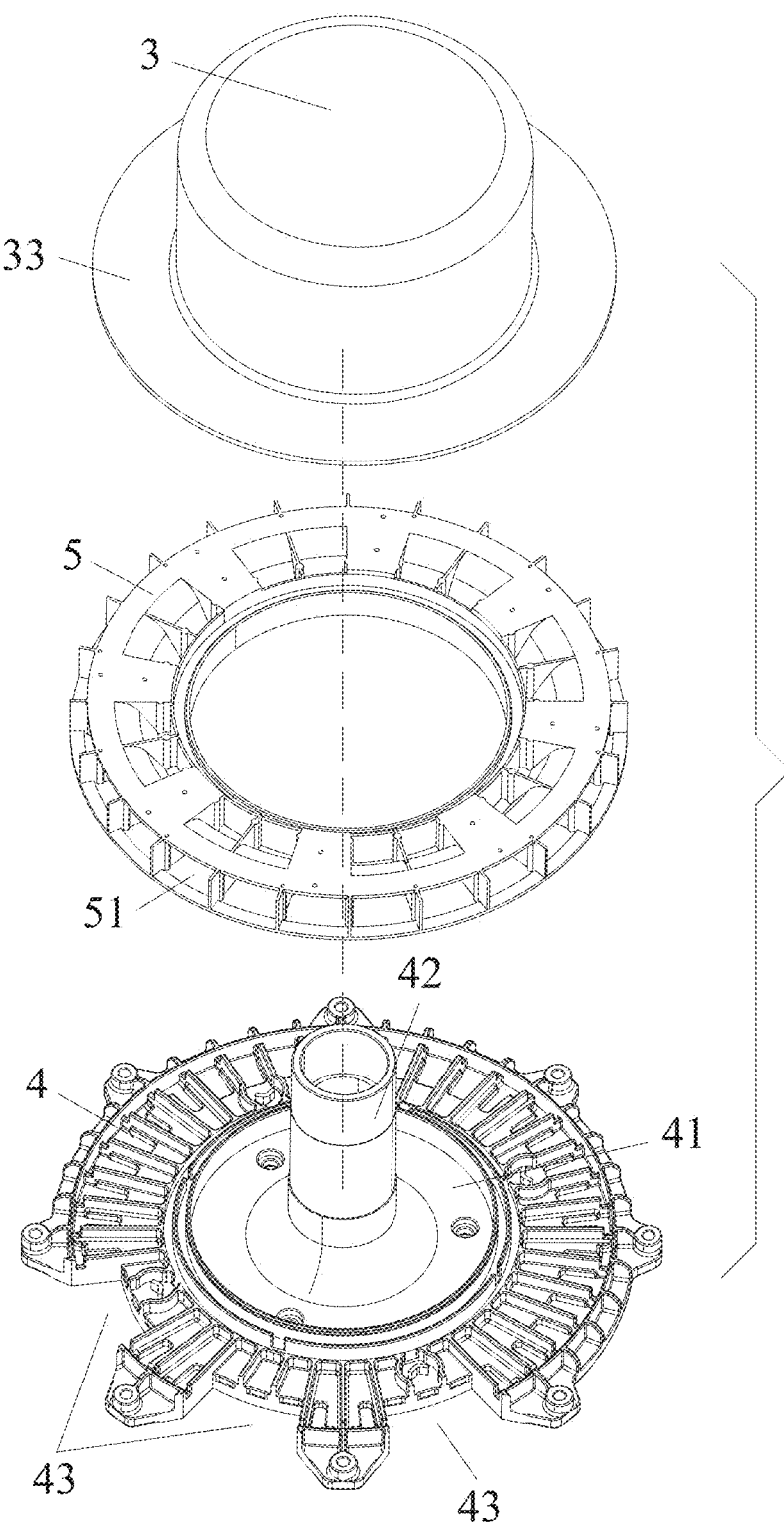
FIG. 5 is an exploded view of a stator assembly and an outer rotor in one embodiment of the disclosure.
Figure 6:
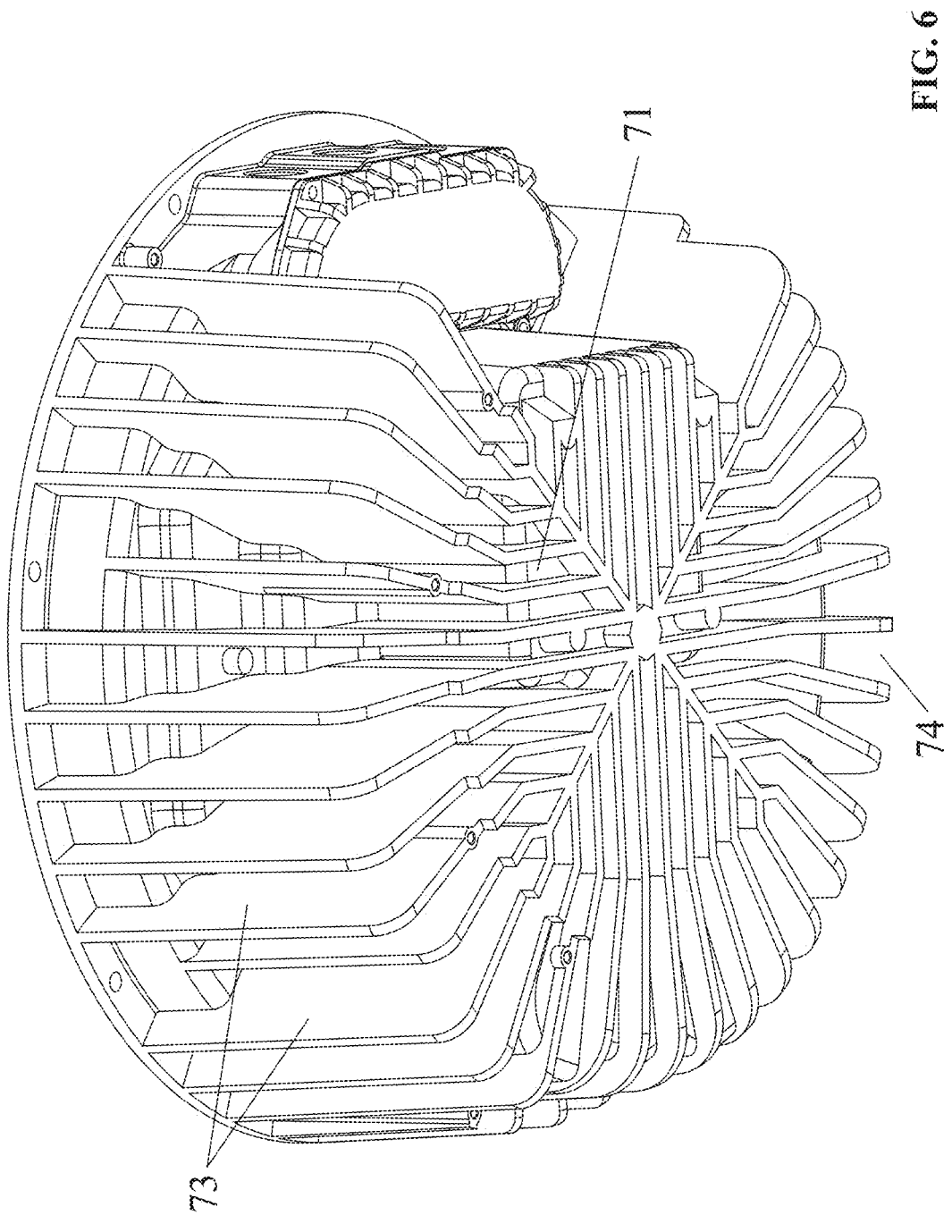
FIG. 6 is a schematic diagram of a control box in one embodiment of the disclosure.
Figure 7:
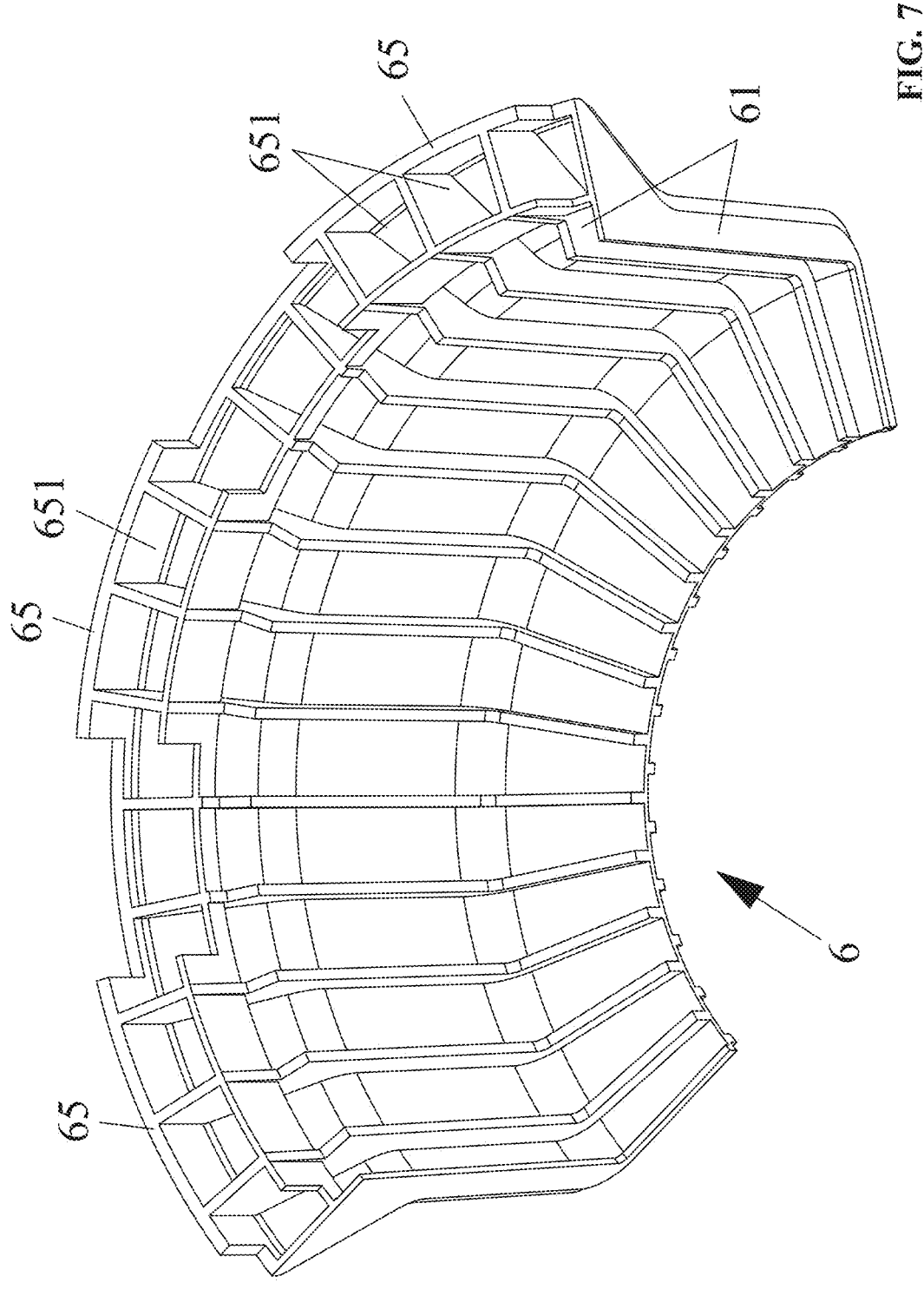
FIG. 7 is a schematic diagram of an air guide cover in one embodiment of the disclosure.
Figure 8:
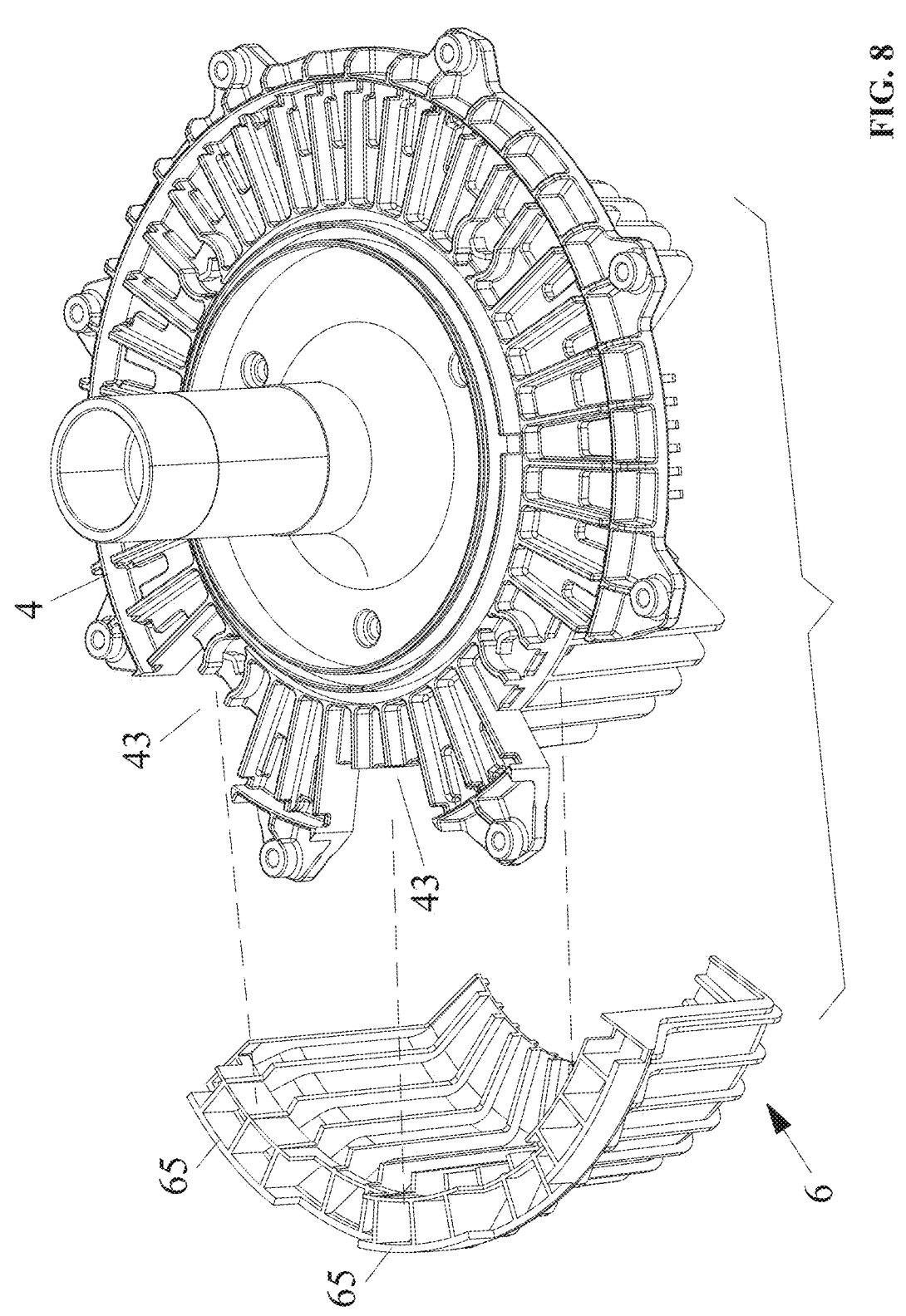
FIG. 8 is a connection diagram of an air guide cover and a bottom plate in one embodiment of the disclosure.
Figure 9:
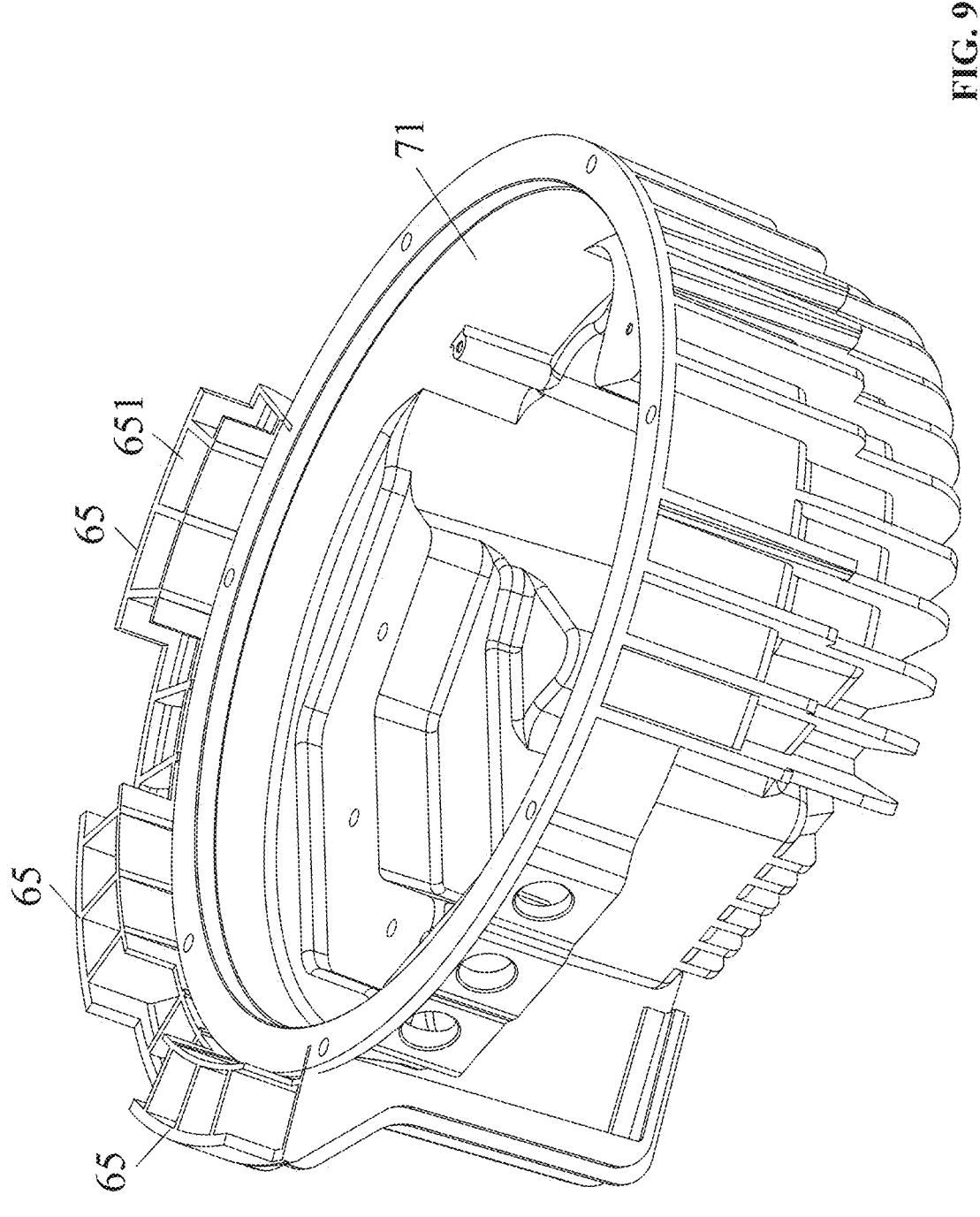
FIG. 9 is a connection diagram of an air guide cover and a control box in one embodiment of the disclosure.

To further illustrate the disclosure, embodiments detailing a heat dissipation device for an outer rotor motor are described below. It should be noted that the following embodiments are intended to describe and not to limit the disclosure.

As shown in FIGS. 1-9, the disclosure provides a heat dissipation device for an outer rotor motor, comprising: a rotary shaft 1, a stator assembly 2, an outer rotor 3, a sleeve seat 4, a wind wheel 5, an air guide cover 6, and a control box 7.

The sleeve seat 4 comprises a bottom plate 41 and a sleeve 42 protruding upwards from a central part of the bottom plate 41; each of two ends of the sleeve 42 comprises a bearing chamber 421, and two bearings 422 are disposed in two bearing chambers 421, respectively; the rotary shaft 1 is disposed in the sleeve 42 and both ends of the rotary shaft are supported on the two bearings 422, respectively.

The outer rotor 3 comprises a casing sleeve 31, a plurality of permanent magnets 32 attached to an inner wall of the casing sleeve 31, and a flange 33; one end of the rotary shaft 1 extends from the sleeve 42 and is connected to the casing sleeve 31; the inner wall of the casing sleeve extends outward to form the flange 33 and an opening surrounded by the flange, and the wind wheel 5 is attached to a bottom end face of the flange 33.

The stator assembly 2 is disposed outside the sleeve 42, and the outer rotor 3 is disposed outside the stator assembly 2.

The control box 7 comprises a box body 71, a control circuit board 72 disposed in the box body 71, a plurality of vertical heat dissipation blades 73 protruding from an outer surface of the box body 71; a part of the vertical heat dissipation blades is covered by the air guide cover 6; a vertical air duct 74 is formed between every two adjacent heat dissipation blades 73 and an inner wall of the air guide cover 6.

The air guide cover 6 comprises a top end comprising a plurality of protrusions 65; each of the plurality of protrusions 65 comprises a through hole 651 communicating with the vertical air duct 74; an edge of the bottom plate 41 comprises a plurality of recesses 43, and the plurality of protrusions 65 are correspondingly embedded in the plurality of recesses 43, respectively; and the through hole 651 is disposed directly below an air inlet 51 of the wind wheel 5.

Figure 10:
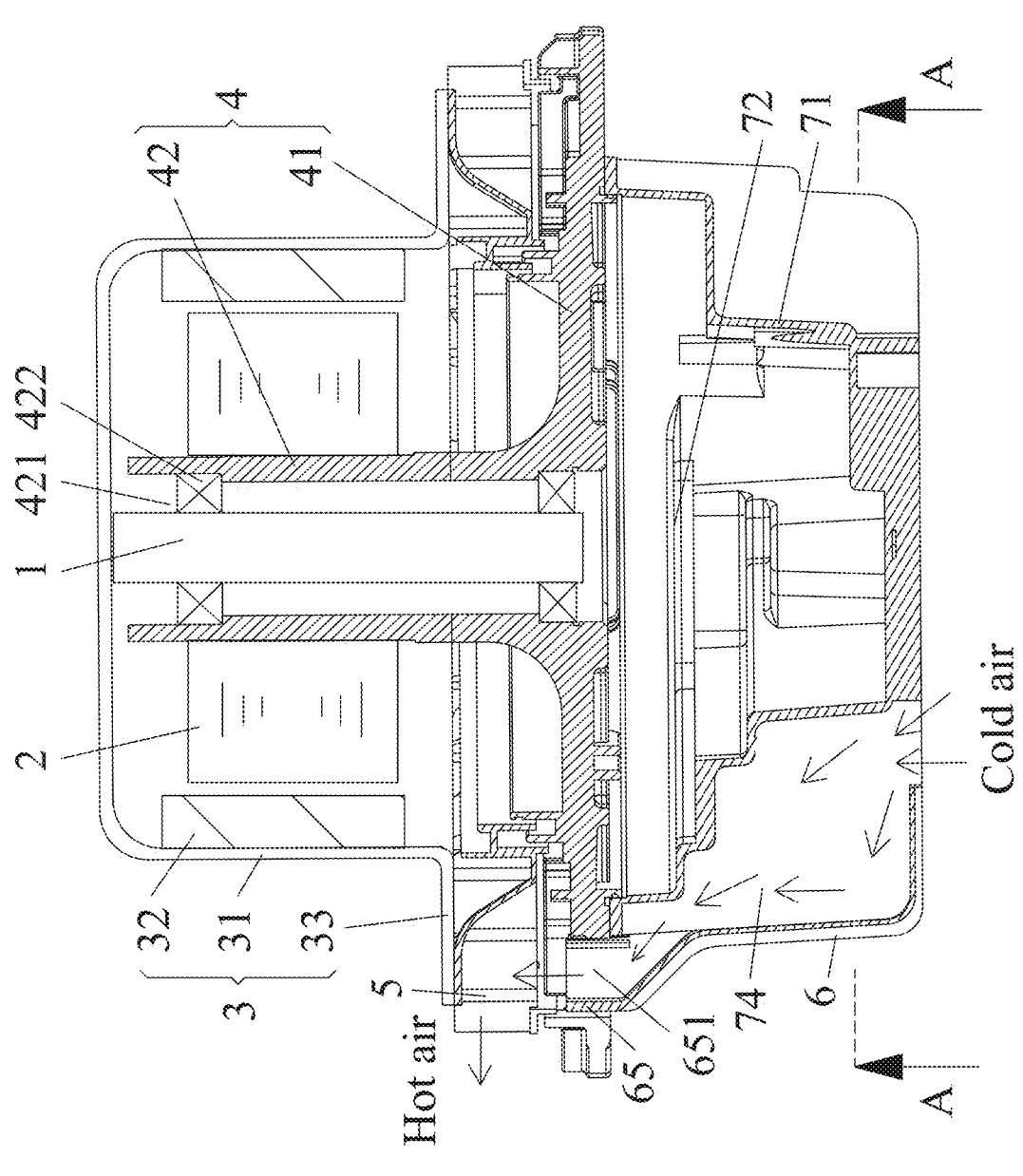
FIG. 10 is a principle diagram of heat dissipation of a heat dissipation device for an outer rotor motor in one embodiment of the disclosure.

As shown in FIG. 10, the working principle of the heat dissipation device for an outer rotor motor is as follows:

When the motor works, the outer rotor 3 rotates, driving the wind wheel 5 to rotate, and the air is threw out from the air outlet of the wind wheel 5, forming a negative pressure at the air inlet of the wind wheel, and the cold air enters the vertical air duct 74 from the bottom of the box body 71 and takes away the heat of the heat dissipation blades 73, and then is pulled out from the through hole 651 located directly below the air inlet 51 of the wind wheel 5 to enter the air inlet of the wind wheel 5. The size of the through hole is not limited by the two adjacent heat dissipation blades, and the through hole is located outside the heat dissipation blades. The device is easy to assemble, and increases the air flow and improves the heat dissipation efficiency.

The inner wall of the air guide cover 6 comprises a plurality of first heat dissipation ribs 61 corresponding to the plurality of heat dissipation blades 73. As the box body 71 is mounted with the air guide cover 6, part of the heat is transferred to the air guide cover 6. The plurality of first heat dissipation ribs 61 can increase the contact surface with cold air inside the air duct 74 to enhance the heat dissipation efficiency.

The air guide cover 6 comprises an outer surface comprising a plurality of second heat dissipation ribs 62. As the box body 71 is mounted with the air guide cover 6, part of the heat is transferred to the air guide cover 6. The plurality of second heat dissipation ribs 62 can enhance the heat dissipation efficiency.

A material for the air guide cover 6 is metal, which facilitates the box body 71 to transfer part of the heat to the air guide cover 6.

The air guide cover 6 comprises three protrusions 65 spaced apart, which is easy to distribute.

The through hole 651 are square in shape, with a large cross-section, which can improve the air flow and enhance the heat dissipation efficiency.

Each of the plurality of protrusions 65 comprises two through holes 651.

It will be obvious to those skilled in the art that changes and modifications may be made, and therefore, the aim in the appended claims is to cover all such changes and modifications.

What is claimed is:

1. A heat dissipation device for an outer rotor motor, comprising:
   a rotary shaft;
   a stator assembly;
   an outer rotor;
   a sleeve seat;
   a wind wheel;
   an air guide cover; and
   a control box;
   wherein:
   the sleeve seat comprises a bottom plate and a sleeve protruding upwards from a central part of the bottom plate; each of two ends of the sleeve comprises a bearing chamber, and two bearings are disposed in two bearing chambers, respectively; the rotary shaft is disposed in the sleeve and both ends of the rotary shaft are supported on the two bearings, respectively;
   the outer rotor comprises a casing sleeve, a plurality of permanent magnets attached to an inner wall of the casing sleeve, and a flange; one end of the rotary shaft extends from the sleeve and is connected to the casing sleeve; the inner wall of the casing sleeve extends outward to form the flange and an opening surrounded by the flange, and the wind wheel is attached to a bottom end face of the flange;
   the stator assembly is disposed outside the sleeve, and the outer rotor is disposed outside the stator assembly;
   the control box comprises a box body, a control circuit board disposed in the box body, a plurality of vertical heat dissipation blades protruding from an outer surface of the box body; a part of the vertical heat dissipation blades is covered by the air guide cover; a vertical air duct is formed between every two adjacent heat dissipation blades and an inner wall of the air guide cover;
   the air guide cover comprises a top end comprising a plurality of protrusions; each of the plurality of protrusions comprises a through hole communicating with the vertical air duct; an edge of the bottom plate comprises a plurality of recesses, and the plurality of protrusions are correspondingly embedded in the plurality of recesses, respectively; and the through hole is disposed directly below an air inlet of the wind wheel.

2. The device of claim 1, wherein the inner wall of the air guide cover comprises a plurality of first heat dissipation ribs corresponding to the plurality of heat dissipation blades.

3. The device of claim 2, wherein the air guide cover comprises an outer surface comprising a plurality of second heat dissipation ribs.

4. The device of claim 3, wherein a material for the air guide cover is metal.

5. The device of claim 4, wherein the air guide cover comprises three protrusions spaced apart.

6. The device of claim 5, wherein the through hole are square in shape.

7. The device of claim 6, wherein each of the plurality of protrusions comprises two through holes.

* * * * *